US010100697B2

(12) United States Patent
Neelagal et al.

(10) Patent No.: US 10,100,697 B2
(45) Date of Patent: Oct. 16, 2018

(54) FLUID DELIVERY SYSTEM FOR EXHAUST AFTERTREATMENT SYSTEM

(71) Applicant: Tenneco Automotive Operating Company Inc., Lake Forest, IL (US)

(72) Inventors: Deenaraj Neelagal, Jackson, MI (US); Larry J. Geer, Jackson, MI (US); Ryan Barrus, Jackson, MI (US)

(73) Assignee: TENNECO AUTOMOTIVE OPERATING COMPANY INC., Lake Forest, IL (US)

( * ) Notice: Subject to any disclaimer, the term of this patent is extended or adjusted under 35 U.S.C. 154(b) by 167 days.

(21) Appl. No.: 15/172,357

(22) Filed: Jun. 3, 2016

(65) Prior Publication Data

US 2017/0292425 A1  Oct. 12, 2017

(30) Foreign Application Priority Data

Apr. 11, 2016 (IN) .............................. 201641012576

(51) Int. Cl.
| | |
|---|---|
| *B01D 39/00* | (2006.01) |
| *B01D 46/00* | (2006.01) |
| *B01D 47/00* | (2006.01) |
| *B01D 53/00* | (2006.01) |
| *F01N 3/20* | (2006.01) |

(Continued)

(52) U.S. Cl.
CPC ......... *F01N 3/208* (2013.01); *B01D 46/0004* (2013.01); *B01D 46/0005* (2013.01); *B01D 46/10* (2013.01); *B01D 46/4263* (2013.01); *B01D 53/005* (2013.01); *F01N 2610/02* (2013.01); *F01N 2610/144* (2013.01); *F01N 2610/1426* (2013.01); *F01N 2610/1486* (2013.01)

(58) Field of Classification Search
None
See application file for complete search history.

(56) References Cited

U.S. PATENT DOCUMENTS

| 3,552,553 A | 1/1971 | Reading |
| 5,807,415 A | 9/1998 | Leo |

(Continued)

FOREIGN PATENT DOCUMENTS

CN  204511600 U  7/2015

*Primary Examiner* — Amber R Orlando
(74) *Attorney, Agent, or Firm* — Harness, Dickey & Pierce, P.L.C.

(57) ABSTRACT

A fluid delivery system for an exhaust aftertreatment system may include an outer housing, a pump, a filter assembly, an electric heating blanket, and a heater retention plate. The heater retention plate is shaped to correspond to the shapes of the pump and filter assembly. A lid of the outer housing contacts the heater retention plate and clamps the heating blanket between the heater retention plate and the pump and filter assembly so that the heating blanket takes the shapes of portions of the pump and filter assembly. The outer housing includes mounting flanges and reinforcement members extending from corresponding mounting flanges to corresponding sidewalls of the outer housing and forming a hollow space therebetween. The filter assembly includes compensation elements that contract in response to expansion of fluid within a pump housing due to freezing and expand in response to thawing of the fluid.

11 Claims, 8 Drawing Sheets

(51) Int. Cl.
  *B01D 46/42*  (2006.01)
  *B01D 46/10*  (2006.01)

(56) References Cited

U.S. PATENT DOCUMENTS

| | | | |
|---|---|---|---|
| 7,089,962 B2 | 8/2006 | Bleeck et al. |
| 7,156,239 B2 | 1/2007 | Klotz et al. |
| 7,278,625 B2 | 10/2007 | Huber et al. |
| 7,481,319 B2 | 1/2009 | Jokschas et al. |
| 7,513,373 B2 | 4/2009 | Kramer |
| 7,708,148 B2 | 5/2010 | Fritze |
| 8,075,020 B2 | 12/2011 | Colosimo et al. |
| 8,282,819 B2 | 10/2012 | Parra Navarrete et al. |
| 8,377,295 B2 | 2/2013 | Strassenberger |
| 8,398,924 B2 | 3/2013 | Hodgson et al. |
| 8,641,896 B2 | 2/2014 | Remacha et al. |
| 8,875,502 B2 | 11/2014 | Fuchs et al. |
| 8,960,165 B2 | 2/2015 | Quednau et al. |
| 2003/0209482 A1 | 11/2003 | Klotz et al. |
| 2004/0094468 A1 | 5/2004 | Fritze |
| 2005/0161394 A1 | 7/2005 | Fritze et al. |
| 2006/0249499 A1* | 11/2006 | Winkler ............ B60H 1/00464 219/202 |
| 2008/0197064 A1* | 8/2008 | Blasco Remacha ... B01D 35/18 210/184 |
| 2010/0314308 A1 | 12/2010 | Pflueger et al. |
| 2011/0056961 A1 | 3/2011 | Amtmann et al. |
| 2012/0132582 A1 | 5/2012 | Gluck et al. |
| 2012/0132733 A1 | 5/2012 | Taylor |
| 2012/0312733 A1 | 12/2012 | Elayed et al. |
| 2013/0126416 A1 | 5/2013 | Weindort et al. |
| 2013/0199979 A1 | 8/2013 | Jauss et al. |
| 2014/0083927 A1 | 3/2014 | Pflueger et al. |
| 2014/0158607 A1 | 6/2014 | Xia et al. |
| 2015/0008172 A1 | 1/2015 | Kocksch |
| 2015/0258473 A1 | 9/2015 | Sakraschinsky et al. |

\* cited by examiner

FLUID DELIVERY SYSTEM FOR EXHAUST AFTERTREATMENT SYSTEM

CROSS-REFERENCE TO RELATED APPLICATIONS

This application claims the benefit and priority of Indian Patent Application No. 201641012576, filed Apr. 11, 2016. The entire disclosure of the above application is incorporated herein by reference.

FIELD

The present disclosure relates to a fluid delivery system for an exhaust aftertreatment system.

BACKGROUND

This section provides background information related to the present disclosure and is not necessarily prior art.

Emission regulation requirements are mandating that combustion engines have exhaust aftertreatment systems to reduce or eliminate the emission of, for example, particulate matter and $NO_X$. To eliminate or reduce the emission of particulate matter and $NO_X$, exhaust aftertreatment systems can include components such as a particulate filter (e.g., a diesel particulate filter (DPF)), a selective catalyst reduction (SCR) component, and a diesel oxidation catalyst (DOC) component.

SCR and DOC components generally work in conjunction with fluid delivery systems that inject a fluid (e.g., a hydrocarbon fluid, urea or other reagent) into the exhaust stream to treat the exhaust before the exhaust enters the SCR or DOC components. In the case of SCR, a reductant solution including urea, for example, may be injected into the exhaust stream before entry into the SCR component. In the case of the DOC, a hydrocarbon reductant such as diesel fuel can be injected into the exhaust stream before entry into the DOC component.

While fluid delivery systems have generally performed well for their intended purposes, there is a need in the art for continuous improvement. The present disclosure provides an improved fluid delivery system that has improved low-temperature performance and durability, and is also compact, structurally sound, and dimensionally stable.

SUMMARY

This section provides a general summary of the disclosure, and is not a comprehensive disclosure of its full scope or all of its features.

The present disclosure provides a fluid delivery system for an exhaust aftertreatment system. The fluid delivery system may include an outer housing, a pump, a filter assembly, an electric heating blanket, and a heater retention plate. The outer housing may include a base and a lid. The pump may be disposed within the outer housing. The filter assembly may be disposed within the outer housing and in fluid communication with the pump. The heating blanket may be disposed within the outer housing and may cover at least a portion of the pump and at least a portion of the filter assembly. The heating blanket is disposed between the lid and the portions of the pump and filter assembly. The heater retention plate may be disposed within the outer housing between the lid and the heating blanket. The heater retention plate may include a body portion and a flange. The body portion may be shaped to correspond to the shapes of the portions of the pump and filter assembly. The flange may extend from the body portion and may contact an interior surface of the lid such that the lid urges the heater retention plate and the heating blanket toward the portions of the pump and filter assembly so that the heating blanket takes the shapes of the portions of the pump and filter assembly.

In some configurations, the body of the heater retention plate includes a concave side and a convex side. The concave side may contact the heating blanket.

In some configurations, the flange extends from an edge of the body and extends around at least a portion of a periphery of the body.

In some configurations, the body of the heater retention plate includes a recessed portion receiving a thermostat of the heating blanket.

In some configurations, the heating blanket is in contact with housings of the pump and filter assembly.

In some configurations, the body of the heater retention plate includes a plurality of reinforcement ribs.

In some configurations, first and second portions of the body of the heater retention plate cooperate to form a V shape.

In some configurations, the first portion of the body includes alignment apertures receiving posts extending from the filter assembly.

In some configurations, the second portion of the body includes an L-shaped tab extending therefrom. The L-shaped tab may receive a mounting fastener.

Another aspect of the present disclosure provides a fluid delivery system for an exhaust aftertreatment system. The fluid delivery system may include a pump, a filter assembly, and an outer housing. The filter assembly may be in fluid communication with the pump. The outer housing may include sidewalls defining a cavity in which the pump and filter assembly are disposed. The outer housing may include mounting flanges extending from corresponding sidewalls away from the cavity in opposite directions. The mounting flanges may include mounting apertures and reinforcement members. Each reinforcement member may extend from a corresponding mounting flange to a corresponding sidewall. Each reinforcement member may cooperate with the corresponding sidewall to form a hollow space therebetween that is outside of the cavity.

In some configurations, the reinforcement members include a curved surface that is inclined relative to the sidewalls.

In some configurations, each reinforcement member is disposed between the mounting apertures of the corresponding mounting flange.

In some configurations, the reinforcement members include generally U-shaped profiles.

In some configurations, the outer housing includes a lid mounted to the sidewalls. An electronic control unit of the fluid delivery system may be mounted on an exterior surface of the lid and may be disposed underneath a bracket that is attached to the exterior surface.

Another aspect of the present disclosure provides a fluid delivery system for an exhaust aftertreatment system. The fluid delivery system may include an outer housing, a pump, and a filter assembly. The pump may be disposed within the outer housing. The filter assembly may be disposed within the outer housing and may be in fluid communication with the pump. The filter assembly may include a pump housing, a tubular filter medium, an elongated first compensation element, a support ring, an annular second compensation element, a cap, and a third compensation element. The filter medium may be disposed within the pump housing. The first compensation element may be disposed within an elongated aperture of the filter medium. The support ring may be disposed within the pump housing at an axial end of the filter medium and may include a plurality of flexible arms defining a central aperture and an annular recess surrounding the central aperture. The second compensation element may be disposed within the annular recess of the support ring. The cap may engage an axial end of the pump housing and may include a body and a post axially from the body. The post may engage the flexible arms of the support ring. The third compensation element may extend circumferentially around the post and may be disposed axially between the body and the second compensation element. The first, second and third compensation elements may be formed from a material that contracts (i.e., shrinks in volume) in response to expansion of fluid within the pump housing due to freezing and expands (i.e., increases in volume) in response to thawing of the fluid.

In some configurations, the post of the cap snaps into engagement with barbed tips of the arms of the support ring.

In some configurations, an axial end of the first compensation element is disposed within the central aperture of the support ring.

In some configurations, the filter assembly includes a first annular seal that sealingly engages the support ring and an inner surface of the pump housing.

In some configurations, the filter assembly includes a second annular seal that sealingly engages an outer rim of the cap and the inner surface of the pump housing.

In some configurations, the third compensation element is disposed radially between the outer rim of the cap and the post of the cap.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
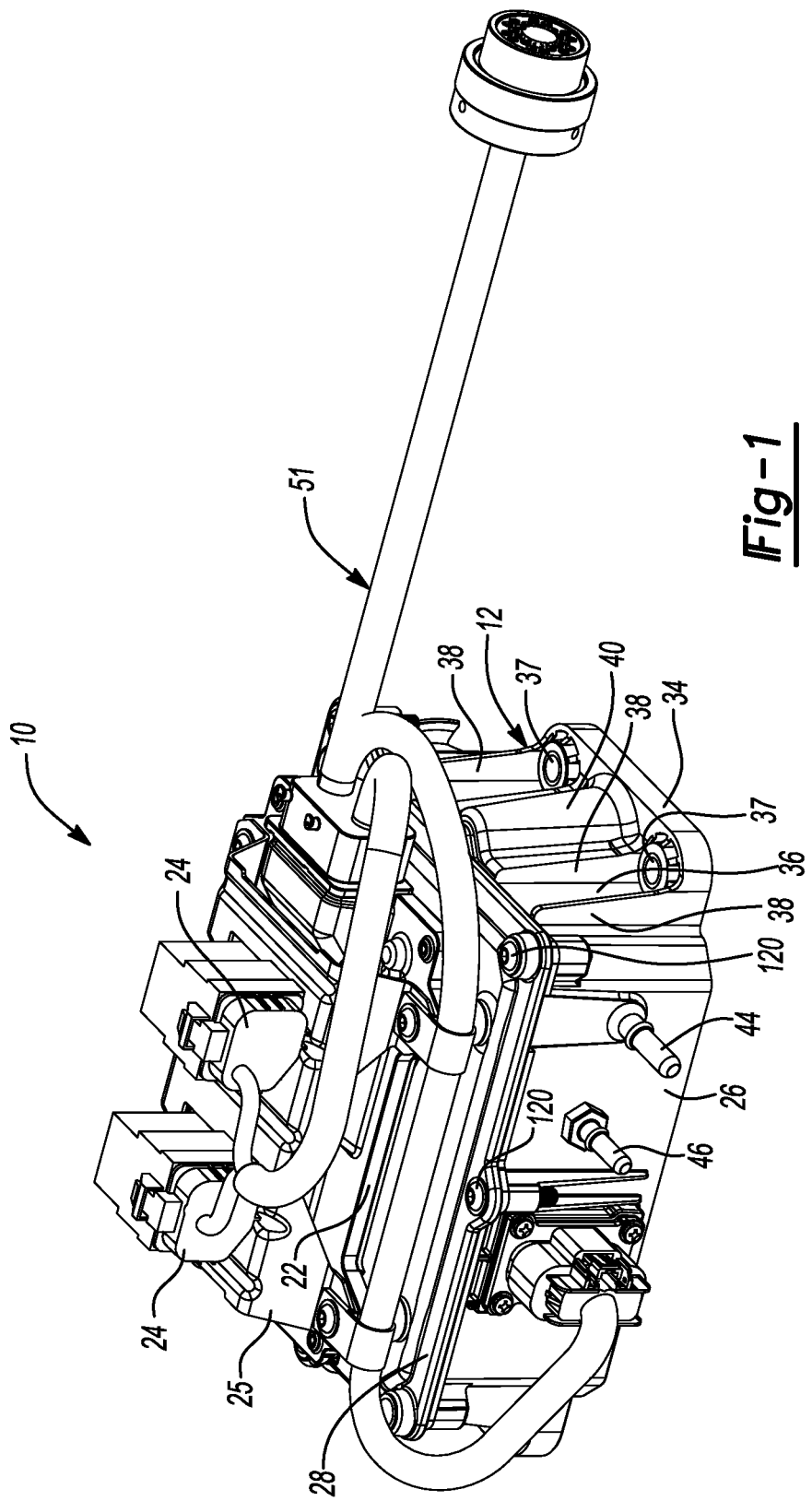
FIG. 1 is a perspective view of a fluid delivery system according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-11, a fluid delivery system 10 is provided. The fluid delivery system 10 may be incorporated into an exhaust aftertreatment system, for example, and may filter and pump a liquid reagent (e.g., urea or a hydrocarbon) or other fluid to a fluid injector (not shown) for injection into an exhaust gas stream. The fluid delivery system 10 may include an outer housing 12, a filter assembly 14, a pump 16, a heating element 18, a heater retention plate 20, an electronic control unit (ECU) 22, and solenoids 24.

The housing 12 may include a base 26 and a lid 28. The base 26 and lid 28 can be formed from any suitable material such as molded plastic or metal. The base 26 may define a cavity 30 in which the filter assembly 14, pump 16, heating element 18, and heater retention plate 20 are disposed. The lid 28 may be secured to the base 26 via fasteners such that the lid 28 encloses the filter assembly 14, pump 16, heating element 18, and heater retention plate 20 within the cavity 30. A sealing member 32 (FIG. 5) may be disposed between the base 26 and lid 28 to seal the cavity 30 off from the ambient environment surrounding the housing 12.

The base 26 may include a plurality of mounting flanges 34 that extend laterally outward from respective sidewalls 36 of the base 26. Each of the mounting flanges 34 may include mounting apertures 37 for receiving fasteners (not shown) that secure the fluid delivery system 10 to a vehicle, for example. Each mounting aperture 37 may be disposed between a pair of reinforcement ribs 38 that extend between the mounting flange 34 and the sidewall 36.

Furthermore, each mounting flange 34 may include an arched reinforcement member 40 disposed between the mounting apertures 37. The arched reinforcement members 40 may be integrally formed with corresponding mounting flanges 34 and the sidewalls 36. The arched reinforcement members 40 have a curved profile and may be angled relative to the sidewalls 36 such that hollow spaces 42 (FIG. 5) between the sidewalls 36 and the arched reinforcement members 40 get narrower as the arched reinforcement members extend upward away from the mounting flanges 34.

Figure 2:
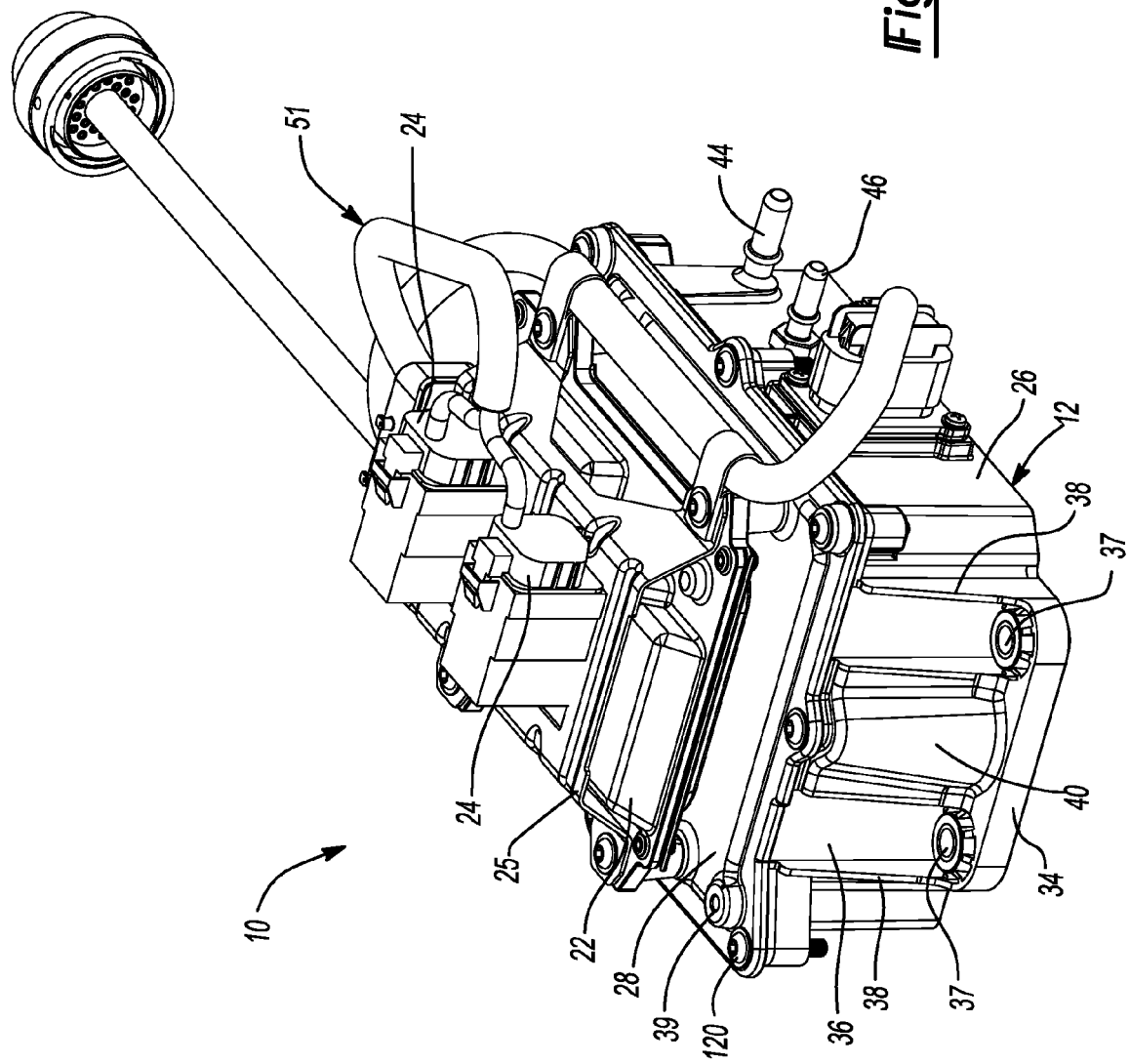
FIG. 2 is another perspective view of the fluid delivery system.

The reinforcement ribs 38 and the reinforcement members 40 both increase the rigidity and structural integrity of the housing 12. This improves the dimensional stability of the base 26 to ensure a proper seal between the base 26 and the lid 28 and alignment of the bolt-hole patterns on the base 26 and lid 28. The support provided by the reinforcement ribs 38 and the reinforcement members 40 is particularly beneficial for configurations of the fluid delivery system 10 having the ECU 22 and solenoids 24 mounted on top of the lid 28, as shown in FIGS. 1 and 2. In the configuration shown in FIGS. 1 and 2, the ECU 22 is mounted on top (i.e., on an exterior surface) of the lid 28 and underneath a bracket 25 that is fastened to the lid 28. The solenoids 24 may be mounted on top of the bracket 25. As shown in FIG. 2, the lid 28 may include one or more additional mounting apertures 39 that can be used to mount various configurations of the bracket 25 and/or other hardware.

As shown in FIGS. 1 and 2, one of the sidewalls 36 of the base 26 includes a fluid-inlet port 44 and a fluid-outlet port 46. In the particular configuration shown in the figures, the fluid-inlet port 44 is integrally formed with the base 26 (e.g., molded with the sidewall 36), and the fluid-outlet port 46 may be a separate metallic component that is fixedly attached to the sidewall 36. In other configurations, the fluid-outlet port 46 may be integrally formed with the base 26 (e.g., molded with the sidewall 36), and the fluid-inlet port 44 may be a separate metallic component that is fixedly attached to the sidewall 36. Fluid may enter the filter assembly 14 through the fluid-inlet port 44. Fluid discharged from the pump 16 may exit the fluid delivery system 10 through the fluid-outlet port 46. In some configurations, a filter (e.g., an edge filter or screen) may be disposed within the fluid-outlet port 46 to prevent debris and/or other contaminants from entering the pump 16 when the pump 16 is operating in a reverse-flow purge mode. Further, in some configurations, a filter (e.g., an edge filter or screen) may be disposed within the fluid-inlet port 44.

The pump 16 (FIGS. 3 and 4) can be any suitable pump including, for example, a conventional urea pump. The ECU 22 and solenoids 24 may control the operation of the pump 16 and the flow of fluid to and from the pump 16. A pressure sensor 45 (FIGS. 3 and 4) may be disposed within the housing 12 and may measure a pressure of fluid flowing through a channel 43 (FIG. 5) that is molded into the base 26 of the housing 12. The channel 43 may fluidly connect the pump 16 and the fluid-outlet port 46 of the housing 12. The pressure sensor 45 may communicate with the ECU 22, and the ECU 22 may control operation of the pump 16 based, in part, on data received from the pressure sensor 45. An internal wire harness 47 (FIGS. 3 and 4) may be electrically connected to the pressure sensor 45 and the pump 16. One or more push nuts 49 and/or other fasteners may be used to secure the internal wire harness 47 relative to the housing 12. An external wire harness 51 (FIGS. 1 and 2) may be electrically connected to the internal wire harness 47, the ECU 22, the solenoids 24, an electrical power source (e.g., a vehicle battery) (not shown) and/or other components.

Figure 4:
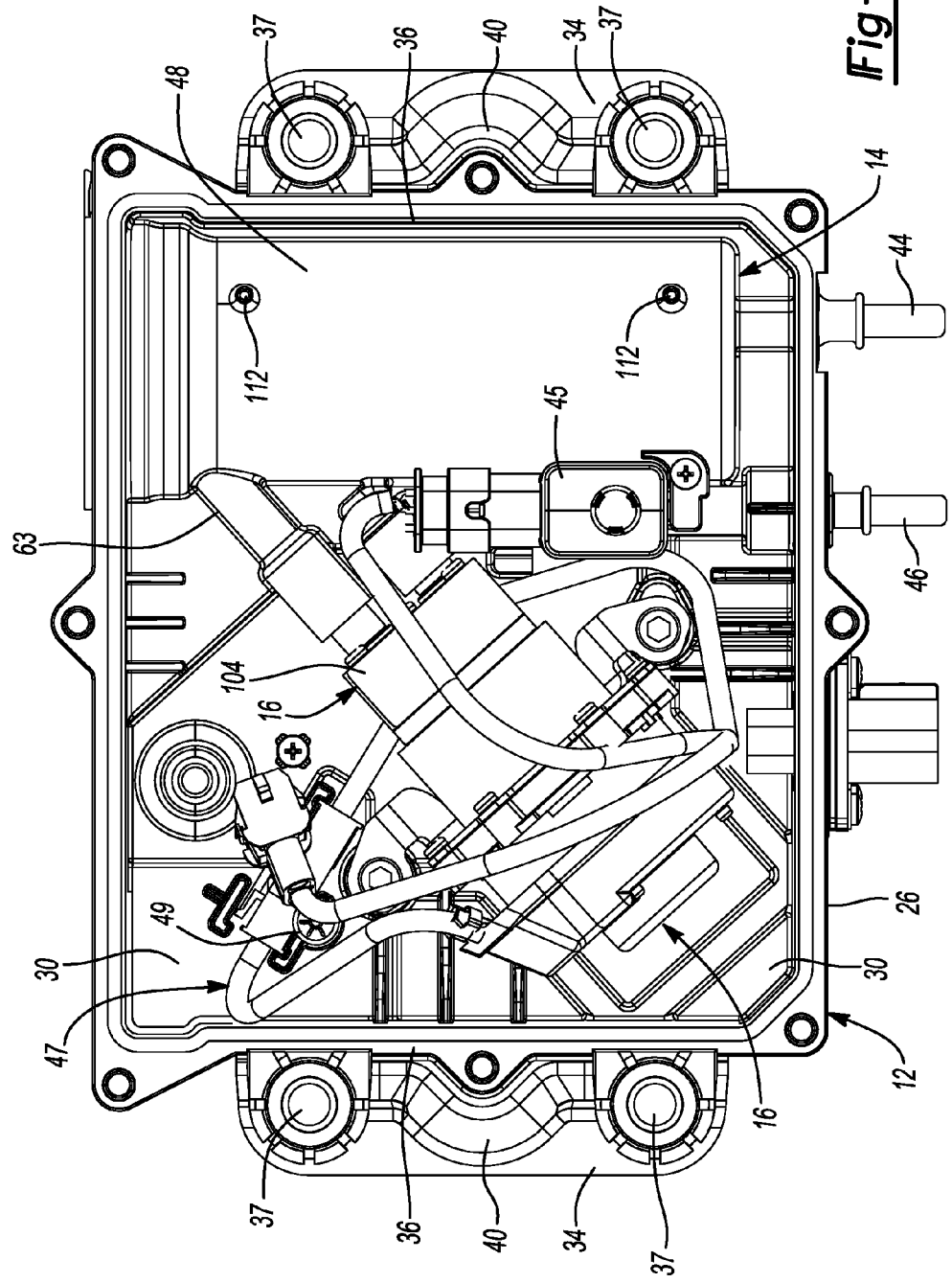
FIG. 4 is another plan view of the outer housing and assembly of FIG. 3 with a heater retention plate and heating element removed.

As shown in FIGS. 7-11, the filter assembly 14 may include a filter housing 48, a filter medium 50, a first compensation element 52, a support ring 54, a second compensation element 56, a cap 58, and a third compensation element 60. The filter medium 50, compensation elements 52, 56, 60, support ring 54 and cap 58 may be at least partially disposed within the filter housing 48. In operation, fluid may enter the filter housing 48 through an inlet 61, flow through the filter medium 50 and exit the filter housing 48 through an outlet 63 that is fluidly coupled with an inlet of the pump 16. As shown in FIG. 4, the outlet 63 may be a generally tubular structure having a longitudinal axis that is angled relative to a longitudinal axis of the filter housing 48 such that the longitudinal axis of the outlet 63 intersects an axial end of the filter housing 48.

Figure 7:
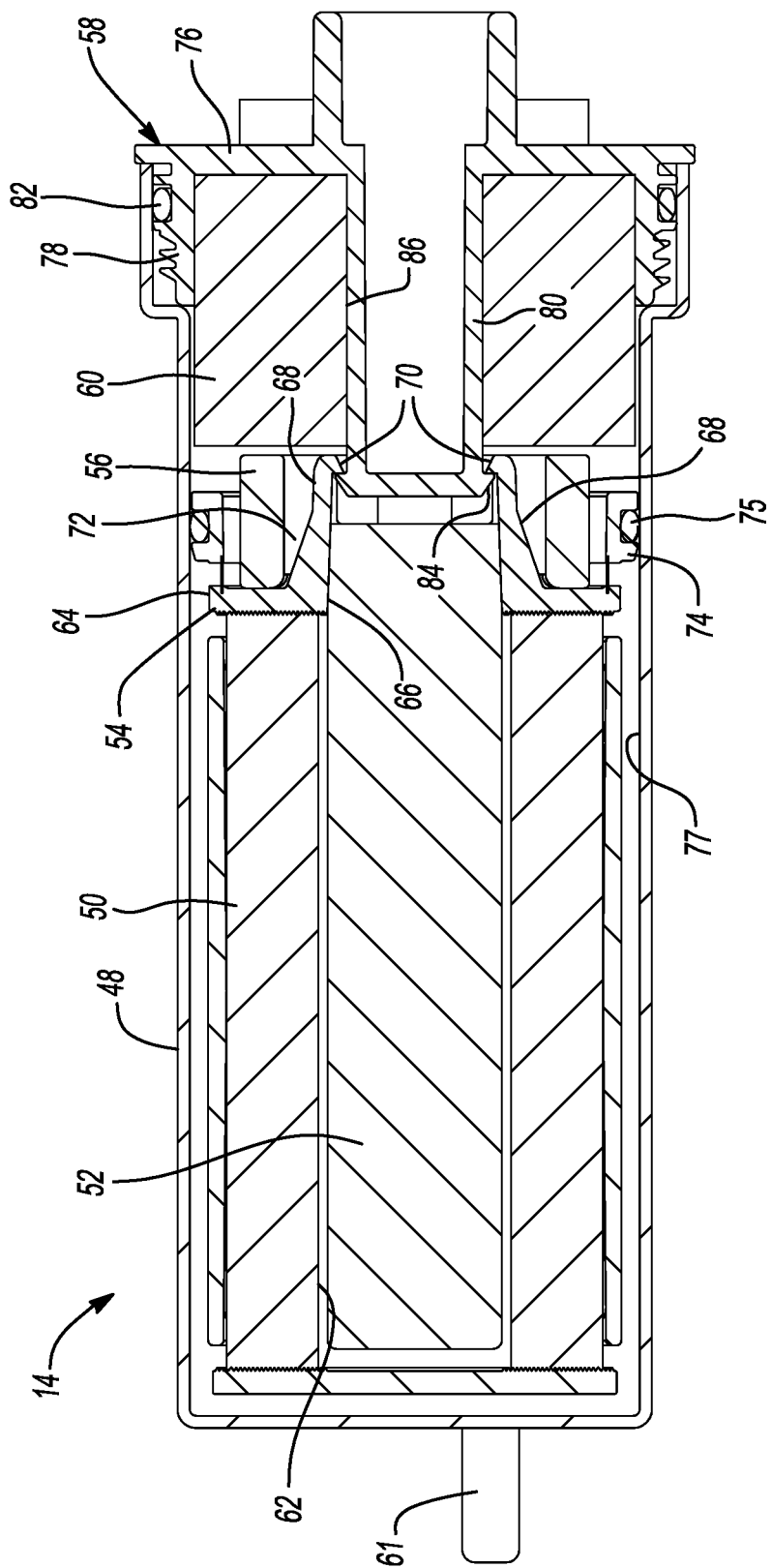
FIG. 7 is a cross-sectional view of a filter assembly of the fluid delivery system.
Figure 8:
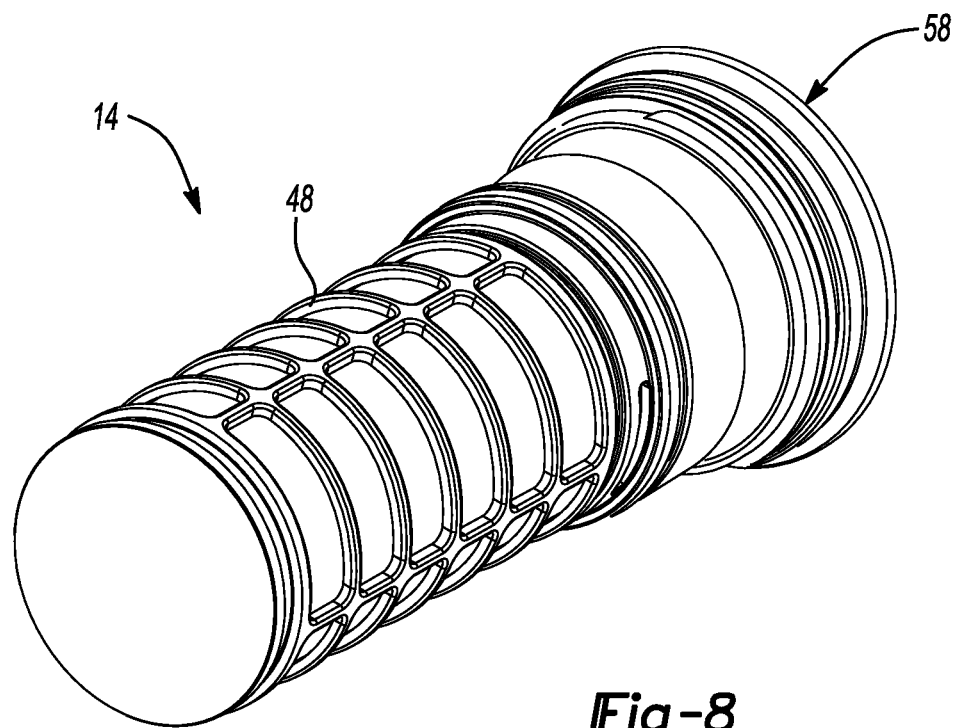
FIG. 8 is a perspective view of the filter assembly.

As shown in FIG. 7, the filter medium 50 may be a generally cylindrical, tubular member formed from a fluid-permeable material. The filter medium 50 may have a central aperture 62 extending axially along a longitudinal axis of the filter medium 50. Debris and impurities may be filtered from a fluid that flows through the filter medium 50.

As shown in FIG. 7, the first compensation element 52 may be a generally cylindrical rod that is partially received in the central aperture 62 of the filter medium 50 and is partially received in the support ring 54. The first compensation element 52 may be formed from a resiliently compressible material that is capable of having its volume decreased as fluid within the filter assembly 14 expands due to freezing and is capable of returning to its previous volume as the fluid thaws. For example, the first, second and/or third compensation elements 52, 56, 60 could be formed from a foam and/or rubber material such as EPDM (ethylene propylene diene monomer), for example. The first compensation element 52 may include a plurality of channels 65 (FIG. 11) formed in its outer periphery that may extend parallel to a longitudinal axis of the first compensation element 52.

Figure 11:
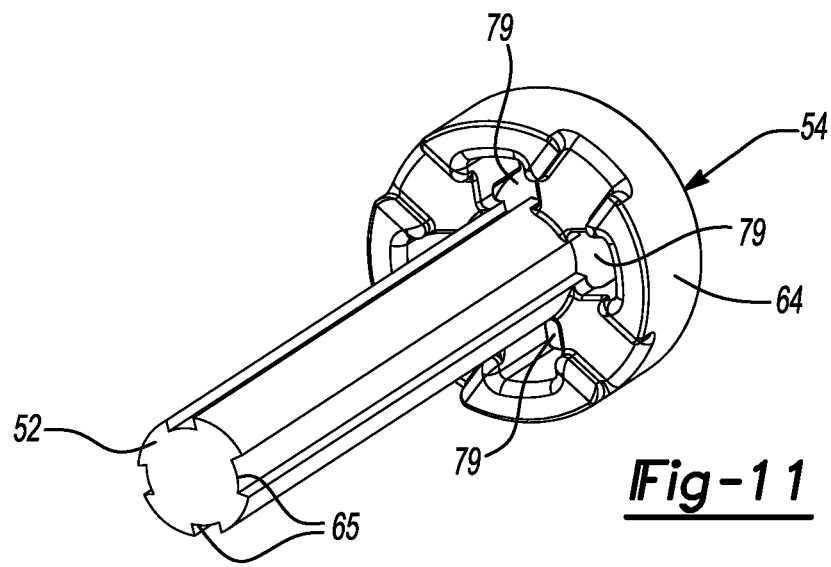
FIG. 11 is a perspective view of a support ring and another compensation element of the filter assembly.

As shown in FIGS. 7 and 11, the support ring 54 may be formed from a hard polymeric material, for example, and may include an annular body 64 having a central aperture 66 that is at least partially defined by a plurality of resiliently flexible arms 68 (FIG. 7). Each arm 68 has a barbed tip 70. An axial end of the first compensation element 52 is disposed within the central aperture 66. The support ring 54 may include an annular recess 72 (FIG. 7) disposed radially between the arms 68 and an outer rim 74 of the body 64. While not shown in FIG. 7, the first compensation element 52 may include one or more radially extending flanges that are received within the annular recess 72. A sealing member 75 (e.g., an O-ring) may sealingly engage the outer rim 74 and an inner diametrical surface 77 of the filter housing 48. An axial end of the body 64 may be engaged with an axial end of the filter medium 50. The body 64 may also include a plurality of apertures 79. Each aperture 79 may be disposed between adjacent arms 68. Each of the channels 65 of the first compensation element 52 may be aligned with one of the apertures 79 to improve fluid flow through the apertures 79.

As shown in FIG. 7, the second compensation element 56 may be an annular member disposed in the annular recess 72 of the support ring 54. The second compensation element 56 may be disposed axially between the filter medium 50 and the third compensation element 60. The second compensation element 56 may extend circumferentially around an axial end of the first compensation element 52. Like the first compensation element 52, the second compensation element 56 may be formed from a resiliently compressible material that is capable of having its volume decreased as fluid within the filter assembly 14 expands due to freezing and is capable of returning to its previous volume as the fluid thaws.

Figure 9:
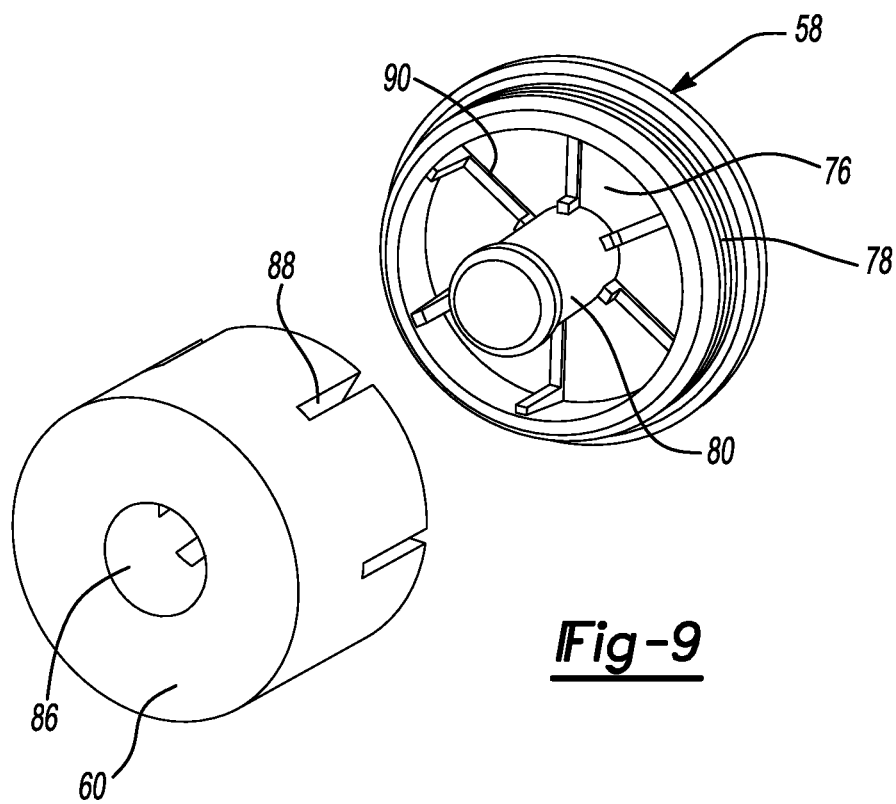
FIG. 9 is an exploded perspective view of a cap and compensation element of the filter assembly.
Figure 10:
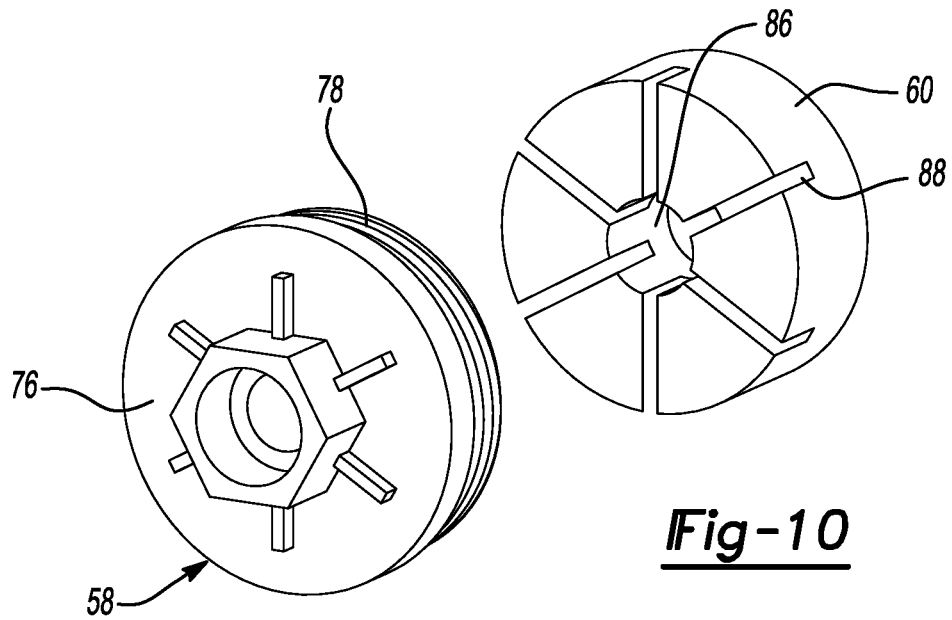
FIG. 10 is another exploded perspective view of the cap and compensation element.

As shown in FIGS. 7, 9 and 10, the cap 58 may be formed from a hard polymeric material, for example, and may include a body 76, an outer rim 78 and a central post 80. The body 76 may extend between the outer rim 78 and central post 80. As shown in FIG. 7, the outer rim 78 may engage the inner diametrical surface 77 of the filter housing 48. A sealing member 82 (e.g., an O-ring) may sealingly engage the outer rim 78 and the inner diametrical surface 77.

The central post 80 may extend longitudinally into the filter housing 48. As shown in FIG. 7, a barbed tip 84 of the central post 80 may extend into the central aperture 66 of the support ring 54 and may snap into engagement with the barbed tips 70 of the arms 68 of the support ring 54. While FIG. 7 shows a space between an axial end of the central post 80 and an axial end of the first compensation element 52, in some configurations, the axial end of the central post 80 may contact the axial end of the first compensation element 52.

As shown in FIG. 7, the third compensation element 60 may be an annular member that extends around and engages the central post 80 of the cap 58. The third compensation element 60 may be disposed radially between the outer rim 78 and central post 80 of the cap 58. The third compensation element 60 may be disposed axially between the body 76 of the cap 58 and the second compensation element 56. Like the first and second compensation elements 52, 56, the third compensation element 60 may be formed from a resiliently compressible material that is capable of having its volume decreased as fluid within the filter assembly 14 expands due to freezing and is capable of returning to its previous volume as the fluid thaws.

As shown in FIGS. 9 and 10, the third compensation element 60 includes a central aperture 86 and a plurality of slots 88 in communication with the central aperture 86. The central aperture 86 may receive the central post 80 of the cap 58. The slots 88 may receive reinforcement ribs 90 formed on the body 76 of the cap 58, thereby allowing the third compensation element 60 to more completely fill spaces between the ribs 90, which maximizes the volume of the third compensation element 60.

As described above, the compensation elements 52, 56, 60 are capable of decreasing their volumes as fluid within the filter assembly 14 expands due to freezing and are capable of returning to their previous volumes as the fluid thaws. The sizes, shapes and materials of the compensation elements 52, 56, 60 may be configured to facilitate a net-zero internal pressure on the filter housing 48 during freeze events (i.e., freezing of the fluids within the filter assembly 14) (for example, assuming 11 bar internal pressure when no compensation elements are in place and 75% effective volume of the compensation elements).

Figure 3:
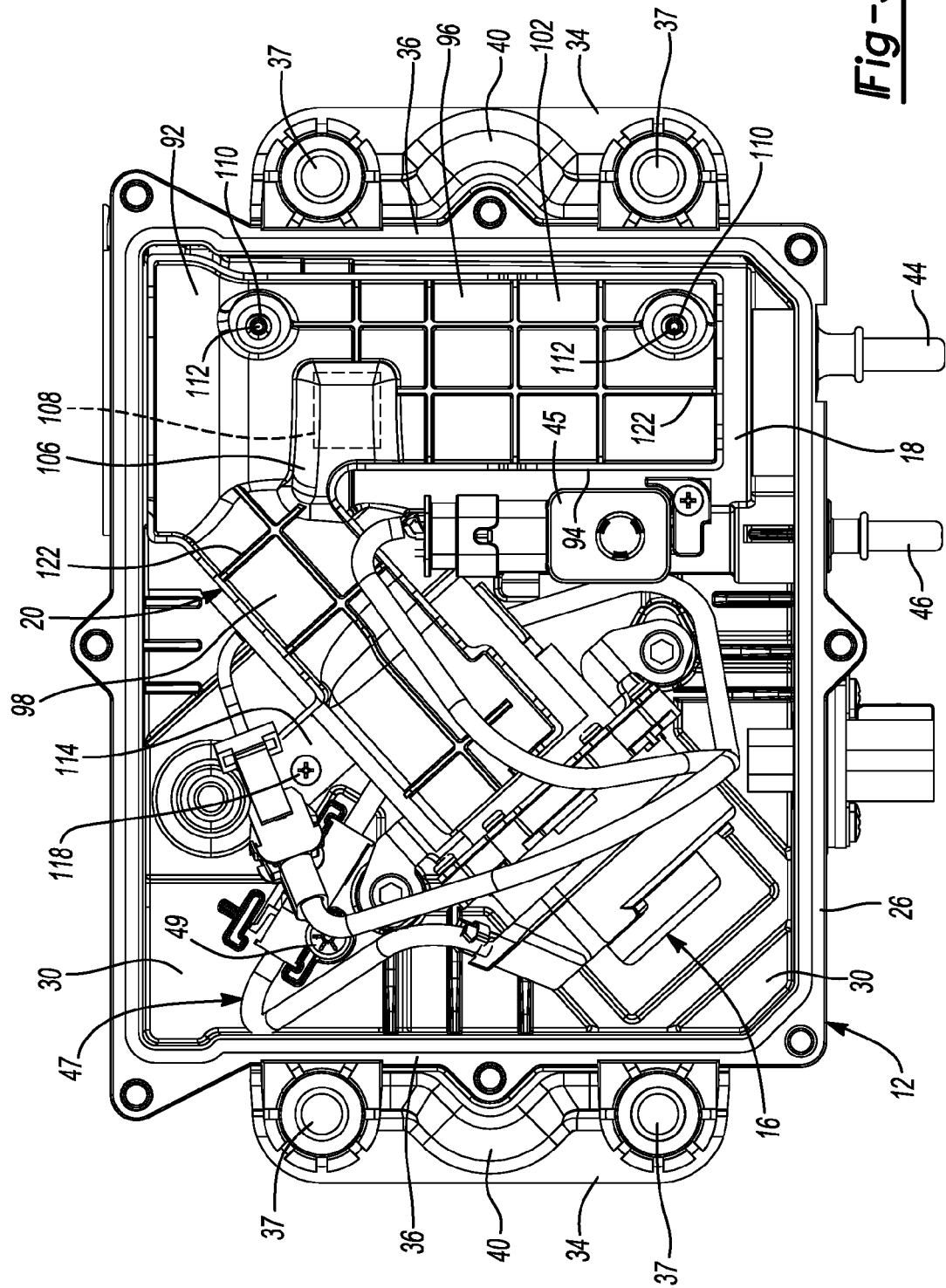
FIG. 3 is a plan view depicting an assembly of components disposed inside of an outer housing of the fluid delivery system.
Figure 5:
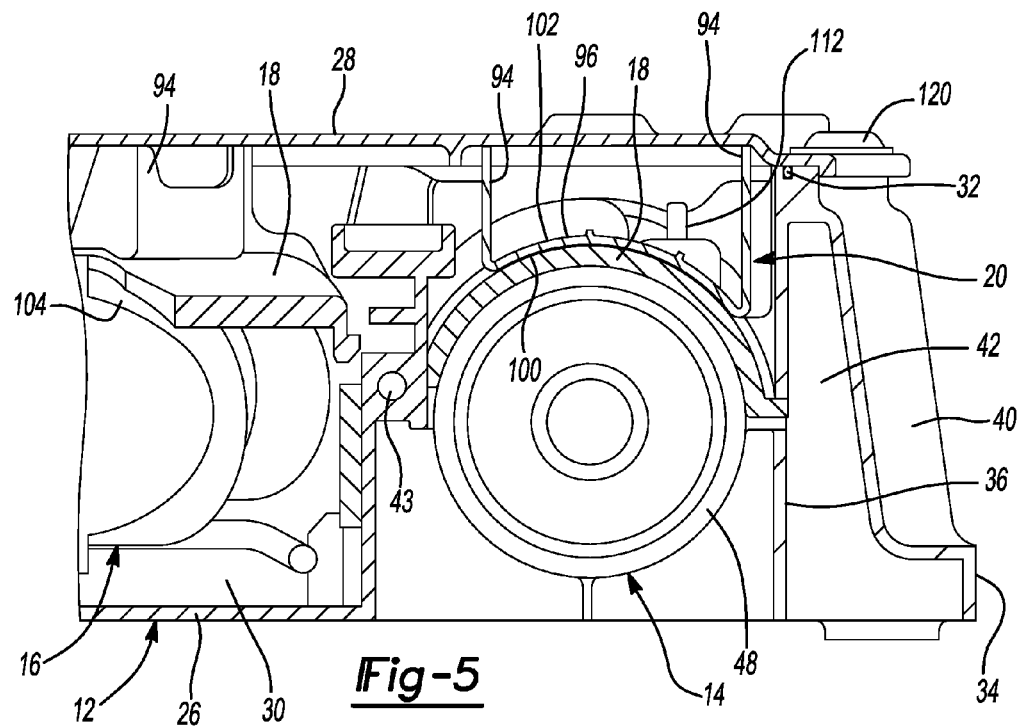
FIG. 5 is a partial cross-sectional view of the fluid delivery system.

As shown in FIGS. 3 and 5, the heating element 18 can be a thin, flexible heating blanket that heats up in response to receiving electrical current. The heating element 18 is in a conductive heat transfer relationship with the filter assembly 14 and pump 16 and is operable to thaw fluid that has frozen within the filter assembly 14 and pump 16. The heating element 18 can be placed over and directly contact at least portions of the filter assembly 14 and pump 16. The heater retention plate 20 can press the heating element 18 into more intimate contact with the filter assembly 14 and pump 16 and force the heating element 18 to take the shapes of the surfaces of the filter assembly 14 and pump 16 with which the heating element 18 is in contact.

Figure 6:
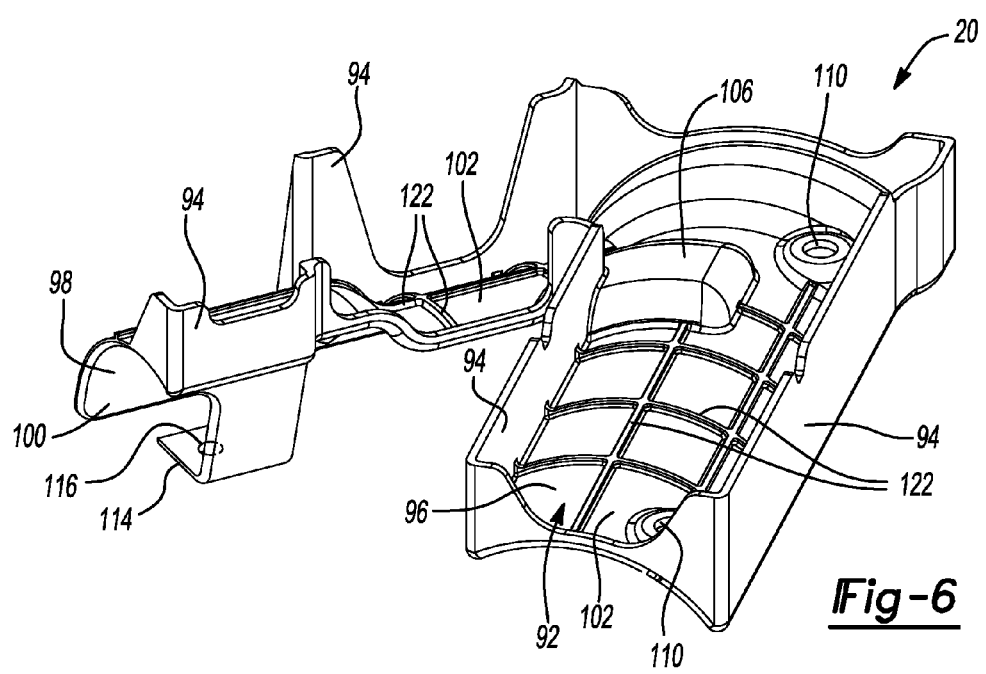
FIG. 6 is a perspective view of the heater retention plate.

Referring now to FIGS. 3, 5 and 6, the heater retention plate 20 may be molded from a polymeric material, for example, and may include a body 92 and one or more flanges 94 extending upward (i.e., toward the lid 28 in a direction perpendicular to a longitudinal axis of the filter assembly 14) from edges of the body 92 such that the flanges 94 define at least a portion of a periphery of the body 92. The body 92 may include a first portion 96 and a second portion 98 that is angled relative to the first portion 96 such that the body 92 is generally V-shaped.

The first and second portions 96, 98 have curved profiles such that the each of the first and second portions 96, 98 have a concave surface 100 and a convex surface 102. As shown in FIG. 5, a portion of the heating element 18 is disposed between the concave surface 100 of the first portion 96 and the filter housing 48 and may be in direct or indirect contact with the concave surface 100 and the filter housing 48. Another portion of the heating element 18 is disposed between the concave surface 100 of the second portion 98 and a pump housing 104 of the pump 16 and may be in direct or indirect contact with the concave surface 100 and the pump housing 104. The first and second portions 96, 98 of the heater retention plate 20 may include contours that generally match or correspond to contours of the surfaces of the filter housing 48 and the pump housing 104, respectively. The first portion 96 may also include a bump or recessed portion 106 (FIGS. 3 and 6) that can receive a thermostat 108 (shown schematically in FIG. 3) of the heating element 18.

As shown in FIGS. 3 and 6, the first portion 96 may include a pair of alignment apertures 110 that receive alignment posts 112 (FIGS. 3-5) that project upward from the filter housing 48 toward the lid 28 of the housing 12. Receiving the posts 112 within the alignment apertures 110 ensures proper alignment of the heater retention plate 20 relative to the filter assembly 14 and the pump 16. The second portion 98 of the heater retention plate 20 may include a generally L-shaped tab 114 that includes a mounting aperture 116. The mounting aperture 116 may receive a fastener 118 that may engage the base 26 of the housing 12 and/or pump housing 104, for example. In some configurations, push nuts (not shown) could be attached to the posts 112.

As described above, during assembly of the fluid delivery system 10, the heating element 18 can be placed over and directly contact at least portions of the filter housing 48 and pump housing 104. The heater retention plate 20 can then be placed on top of the heating element 18. Thereafter, the lid 28 of the housing 12 can be fastened to the base 26 of the housing 12. As the lid 28 is fastened to the base 26 (i.e., as mounting bolts 120 are tightened), the lid 28 contacts and pushes down on the flanges 94 of the heater retention plate 20 and clamps the heater retention plate 20 between the lid 28 and the filter and pump housings 48, 104, thereby causing the heater retention plate 20 to press the heating element 18 into more intimate contact with the filter housing 48 and the pump housing 104. Pressing the heating element 18 into more intimate contact with the filter housing 48 and the pump housing 104 forces the heating element 18 to take the shapes of the surfaces of the filter housing 48 and the pump housing 104, which reduces or eliminates air gaps between the heating element 18 and the filter and pump housings 48, 104 and improves conductive heat transfer therebetween. The first and second portions 96, 98 of the heater retention plate 20 may include a plurality of reinforcement ribs 122, which increase the stiffness of the heater retention plate 20 so that the clamping force of the heater retention plate 20 on the heating element 18 is more evenly distributed.

In addition to improving heat transfer between the heating element 18 and the filter and pump housings 48, 104, retaining the heating element 18 with the heater retention plate 20 as described above eliminates the need for adhesive on the heating element 18 and tie straps to retain the heating element 18 on the filter and pump housings 48, 104 as well as the need for space in the housing 12 to accommodate installation of the tie straps (i.e., the heater retention plate 20 eliminates the need for access to the underside of the filter assembly 14 to wrap tie straps around the heating element 18 and the filter housing 48).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fluid delivery system for an exhaust aftertreatment system, the fluid delivery system comprising:
an outer housing including a base and a lid;
a pump disposed within the outer housing;
a filter assembly disposed within the outer housing and in fluid communication with the pump;
an electric heating blanket disposed within the outer housing and covering at least a portion of the pump and at least a portion of the filter assembly, the heating blanket is disposed between the lid and the portion of the pump and the portion of the filter assembly; and
a heater retention plate disposed within the outer housing between the lid and the heating blanket, the heater retention plate having a body portion and a flange, the body portion shaped to correspond to the shapes of the portion of the pump and the portion of the filter assembly, the flange extending from the body portion and contacting an interior surface of the lid such that the lid urges the heater retention plate and the heating blanket toward the portions of the pump and filter assembly so that the heating blanket takes the shapes of the portions of the pump and filter assembly.

2. The fluid delivery system of claim 1, wherein the body of the heater retention plate includes a concave side and a convex side, the concave side contacting the heating blanket.

3. The fluid delivery system of claim 2, wherein the flange extends from an edge of the body and extends around at least a portion of a periphery of the body.

4. The fluid delivery system of claim 3, wherein the body of the heater retention plate includes a recessed portion receiving a thermostat of the heating blanket.

5. The fluid delivery system of claim 4, wherein the heating blanket is in contact with housings of the pump and filter assembly.

6. The fluid delivery system of claim 5, wherein the body of the heater retention plate includes a plurality of reinforcement ribs.

7. The fluid delivery system of claim 6, wherein first and second portions of the body of the heater retention plate cooperate to form a V shape.

8. The fluid delivery system of claim 7, wherein the first portion of the body includes alignment apertures receiving posts extending from the filter assembly.

9. The fluid delivery system of claim 8, wherein the second portion of the body includes an L-shaped tab extending therefrom, the L-shaped tab receiving a mounting fastener.

10. The fluid delivery system of claim 9, wherein the base of the outer housing includes sidewalls defining a cavity in which the pump, filter assembly, heating blanket and heater retention plate are disposed, the base including a pair of mounting flanges extending from respective sidewalls away from the cavity, the mounting flanges including mounting apertures and reinforcement members, each reinforcement member extending from a corresponding mounting flange to a corresponding sidewall, each reinforcement member cooperating with the corresponding sidewall to form a hollow space therebetween that is outside of the cavity.

11. The fluid delivery system of claim 10, wherein the filter assembly comprises:
a tubular filter medium;
an elongated first compensation element disposed within an elongated aperture of the filter medium;
a support ring disposed at an axial end of the filter medium and including a plurality of flexible arms defining a central aperture and an annular recess surrounding the central aperture;
an annular second compensation element disposed within the annular recess of the support ring;

a cap including a body and a post axially from the body, the post engaging the flexible arms of the support ring; and a third compensation element extending circumferentially around the post and disposed axially between the body and the second compensation element, wherein the first, second and third compensation elements are formed from a material that contracts in response to expansion of fluid within the pump housing due to freezing and expands in response to thawing of the fluid.

\* \* \* \* \*